(12) United States Patent
Jalaliyazdi et al.

(10) Patent No.: US 12,151,664 B2
(45) Date of Patent: Nov. 26, 2024

(54) SYSTEM AND METHOD FOR ASSESSING HEALTH OF BRAKE ROTORS

(71) Applicant: GM GLOBAL TECHNOLOGY OPERATIONS LLC, Detroit, MI (US)

(72) Inventors: Milad Jalaliyazdi, Richmond Hill (CA); Graeme R. Garner, York (CA); Hossein Sadjadi, Markham (CA); Hamed Kazemi, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 720 days.

(21) Appl. No.: 17/207,117

(22) Filed: Mar. 19, 2021

(65) Prior Publication Data

US 2022/0297648 A1  Sep. 22, 2022

(51) Int. Cl.
| | |
|---|---|
| B60T 8/32 | (2006.01) |
| B60T 8/17 | (2006.01) |
| B60T 8/171 | (2006.01) |
| B60T 8/58 | (2006.01) |
| B60T 8/88 | (2006.01) |

(Continued)

(52) U.S. Cl.
CPC ............. *B60T 8/326* (2013.01); *B60T 8/17* (2013.01); *B60T 8/171* (2013.01); *B60T 8/58* (2013.01); *B60T 8/885* (2013.01); *B60T 17/221* (2013.01); *B60T 7/042* (2013.01); *B60T 2220/04* (2013.01); *B60T 2240/00* (2013.01);

(Continued)

(58) Field of Classification Search
CPC . B60T 7/04; B60T 7/042; B60T 8/329; B60T 8/3205; B60T 8/58; B60T 8/88; B60T 8/885; B60T 13/58; B60T 13/662; B60T 13/686; B60T 13/741; B60T 17/22; B60T 17/221; B60T 17/043; B60T 2220/04; B60T 2240/00; B60T 2250/04; B60T 2270/402; B60T 2270/403; B60T 2270/406

See application file for complete search history.

(56) References Cited

U.S. PATENT DOCUMENTS 6,244,391 B1 * 6/2001 Bunker ................... F16D 55/36
                                                               188/18 A
2006/0241892 A1 * 10/2006 Gustavsson ........... B60C 23/061
                                                               702/148

(Continued)

FOREIGN PATENT DOCUMENTS

CN   110562225 A   12/2019

OTHER PUBLICATIONS

U.S. Appl. No. 17/174,742, filed Feb. 12, 2021, Sadjadi et al.
Office Action dated Jun. 16, 2023 from Chinese Patent Office for Chinese Patent Application No. 202111523905.3; 9 pages.

*Primary Examiner* — Hai H Huynh
*Assistant Examiner* — Johnny H Hoang (57) ABSTRACT

A system includes a brake torque request module, a brake control module, and a diagnostic module. The brake torque request module is configured to generate a brake torque request based on a brake pedal position during a braking event. The brake control module is configured to apply friction brakes on a wheelset of a vehicle to satisfy the brake torque request during the braking event. The wheelset includes less than all wheels of the vehicle. The diagnostic module is configured to detect a fault in a brake rotor on a wheel in the wheelset based on vehicle operating conditions measured during the braking event.

19 Claims, 7 Drawing Sheets

(51) Int. Cl.
*B60T 17/22* (2006.01)
*B60T 7/04* (2006.01)
(52) U.S. Cl.
CPC ..... *B60T 2250/00* (2013.01); *B60T 2270/406* (2013.01); *B60T 2270/88* (2013.01)

(56) References Cited

U.S. PATENT DOCUMENTS

| | | | |
|---|---|---|---|
| 2009/0187320 A1* | 7/2009 | Antanaitis | B60L 3/0076 |
| | | | 701/70 |
| 2016/0245351 A1* | 8/2016 | Johnson | B60T 8/173 |
| 2017/0297549 A1* | 10/2017 | Huang | B60T 13/745 |
| 2019/0009769 A1* | 1/2019 | Antanaitis | B60W 30/00 |
| 2019/0389446 A1* | 12/2019 | Du | B60T 17/226 |
| 2020/0001849 A1* | 1/2020 | Medinei | B60T 17/221 |
| 2020/0102993 A1* | 4/2020 | Antanaitis | B60T 17/22 |
| 2021/0253069 A1* | 8/2021 | Thompson | B60S 1/68 |

* cited by examiner

SYSTEM AND METHOD FOR ASSESSING HEALTH OF BRAKE ROTORS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for assessing the health of brake rotors.

Disc brake systems typically include disc brakes on all wheels of a vehicle and a hydraulic cylinder such as a master cylinder. Each disc brake includes a brake rotor and a brake caliper. Each brake rotor is attached to one of the wheels and rotates with that wheel. Each brake caliper is attached to an axle or a suspension knuckle. When the disc brakes are applied, the brake calipers press brake pads therein against opposite planar surfaces on disc portions of the brake rotors to create friction and thereby decrease the rotational speeds of the wheels. The hydraulic cylinder regulates the pressure of brake fluid supplied to the disc brakes to apply or release the disc brakes.

SUMMARY

A first example of a system according to the present disclosure includes a brake torque request module, a brake control module, and a diagnostic module. The brake torque request module is configured to generate a brake torque request based on a brake pedal position during a braking event. The brake control module is configured to apply friction brakes on a wheelset of a vehicle to satisfy the brake torque request during the braking event. The wheelset includes less than all wheels of the vehicle. The diagnostic module is configured to detect a fault in a brake rotor on a wheel in the wheelset based on vehicle operating conditions measured during the braking event.

In one aspect, the wheelset includes only two of the wheels of the vehicle.

In one aspect, the vehicle operating conditions include brake circuit pressure, vehicle longitudinal acceleration, and wheel speed.

In one aspect, the brake control module is configured to determine whether an enabling condition is met, apply the friction brakes on the wheelset to satisfy the brake torque request when the enabling condition is met, and apply the friction brakes on all of the wheels of the vehicle to satisfy the brake torque request when the enabling condition is not met. The enabling condition is met when the brake pedal position, a deceleration of the vehicle, and a speed of the vehicle are greater than predetermined values.

In one aspect, the brake control module is configured to determine whether the friction brakes on the wheelset can satisfy the brake torque request, apply the friction brakes on only the wheelset during the braking event when the friction brakes on the wheelset can satisfy the brake torque request, and apply the friction brakes on all of the wheels of the vehicle during the braking event when the friction brakes on the wheelset cannot satisfy the brake torque request.

In one aspect, the brake torque request module is configured to generate N brake torque requests based on the brake pedal position during N braking events, the brake control module is configured to apply the friction brakes on N wheelsets to satisfy the N brake torque requests during the N braking events, the brake control module is configured to apply the friction brakes on only one of N wheelsets during each of the N braking events, and the diagnostic module is configured to detect a fault in the brake rotor on a wheel in the N wheelsets based on the vehicle operating conditions measured during the N braking events. N is an integer greater than one. Each of the N wheelsets includes a unique combination of the wheels. At least one of the N wheelsets include less than all of the wheels.

In one aspect, multiple ones of the N wheelsets includes less than all of the wheels of the vehicle.

In one aspect, N is equal to five, one of the N wheelsets includes all of the wheels of the vehicle, and the rest of the N wheelsets include only two of the wheels of the vehicle.

In one aspect, the diagnostic module is configured to convert signals indicating the vehicle operating conditions from a time domain to an angle domain, and detect a fault in the brake rotor on a wheel in the wheelset based on the converted signals.

In one aspect, the vehicle operating conditions include a wheel speed, a longitudinal acceleration of the vehicle, and a brake circuit pressure, and the diagnostic module is configured to detect a fault in the brake rotor on a wheel in the wheelset based on a correlation between the wheel speed and the brake circuit pressure and a correlation between the wheel speed and the vehicle longitudinal acceleration.

Another example of a system according to the present disclosure includes a wheel speed sensor and a diagnostic module. The wheel speed sensor is configured to generate a wheel speed signal indicating a speed of a wheel as a function of time. The diagnostic module is configured to convert the wheel speed signal from a time domain to an angle domain and detect a fault in a component associated with the wheel based on the converted wheel speed signal. The converted wheel speed signal indicates the speed of the wheel as a function of an angle of the wheel.

In one aspect, the component is a brake rotor.

In one aspect, the wheel speed sensor is configured to measure pulses in a raw wheel speed signal when the wheel passes through predetermined angular increments, generate the wheel speed signal to indicate the speed of the wheel at times corresponding to the pulses and at times between the pulses, and convert the wheel speed signal from the time domain to the angle domain by removing wheel speeds corresponding to the times between the pulses.

In one aspect, the wheel speed sensor is configured to generate the wheel speed signal to indicate the speed of the wheel at times corresponding to a subset of the pulses that does not include all of the pulses, determine wheel speeds for a remainder of the pulses using interpolation, and convert the wheel speed signal from the time domain to the angle domain by adding the wheel speeds for the remainder of the pulses.

In one aspect, the system further includes a vehicle sensor configured to generate a vehicle signal indicating a vehicle operating condition, other than wheel speed, as a function of time, and the diagnostic module is configured to convert the vehicle signal from the time domain to the angle domain and detect a fault in a component associated with the wheel based on the converted wheel speed signal and the converted vehicle signal. The converted vehicle signal indicates the vehicle operating condition as a function of an angle of the wheel.

Another example of a system according to the present disclosure includes a wheel speed sensor, a brake circuit pressure sensor, and a diagnostic module. The wheel speed sensor is configured to generate a wheel speed signal indicating a speed of a wheel as a function of time. The brake circuit pressure sensor is configured to generate a brake circuit pressure signal indicating a pressure of brake fluid within a hydraulic cylinder as a function of time. The hydraulic cylinder actuates a friction brake on the wheel. The diagnostic module is configured to detect a fault in a brake rotor of the friction brake based on a correlation between the wheel speed signal during a brake event and the brake circuit pressure signal during the brake event.

In one aspect, the diagnostic module is configured to convert the wheel speed signal and the brake circuit pressure signal a time domain to an angle domain and detect a fault in the brake rotor based on a correlation between the converted wheel speed signal and the converted brake circuit pressure signal. The converted signals are a function of an angle of the wheel.

In one aspect, the diagnostic module is configured to detrend the wheel speed signal, detrend the brake circuit pressure signal, and detect a fault in the brake rotor based on a correlation between the detrended wheel speed signal and the detrended brake circuit pressure signal.

In one aspect, the diagnostic module is configured to assess the correlation between the wheel speed signal and the brake circuit pressure signal by shifting one of the wheel speed signal and the brake circuit pressure signal, and determining a correlation coefficient based on the wheel speed signal and the brake circuit pressure signal.

In one aspect, the diagnostic module is configured to detect a fault in the brake rotor when the correlation coefficient is greater than a predetermined value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

As discussed above, in disc brake systems, brake calipers press brake pads against the opposite planar surfaces of disc portions of brake rotors to create friction and thereby decrease the rotational speeds of the wheels on a vehicle. Over time, this causes inconsistent wear grooves in the opposite planar surfaces of the brake rotors, which results in variations in the thicknesses of the brake rotors. As the thickness variation of the brake rotors increase, the disc brakes may not perform as well as the disc brakes perform when the disc brakes are new.

A brake health assessment system according to the present disclosure assesses the health of brake rotors by performing dynamic brake torque distribution, determining brake health indicators, and estimating rotor thickness variations. Dynamic brake torque distribution involves applying different brake torques on each wheel of a vehicle to satisfy a brake torque request during a braking event and measuring vehicle operating conditions during the braking event. The brake health indicators include characteristics of signals indicating the vehicle operating conditions measured during a braking event.

The brake health indicators may also include a measure of correlation between these signals. The brake health assessment system may convert these signals from a time domain to an angle domain before determining the brake health indicators based thereon. The brake health assessment system estimates the rotor thickness variations based on the brake health indicators using regression models. The brake health assessment system identifies a fault in one of the brake rotors when the thickness variation of that brake rotor is greater than a predetermined value.

Figure 1:
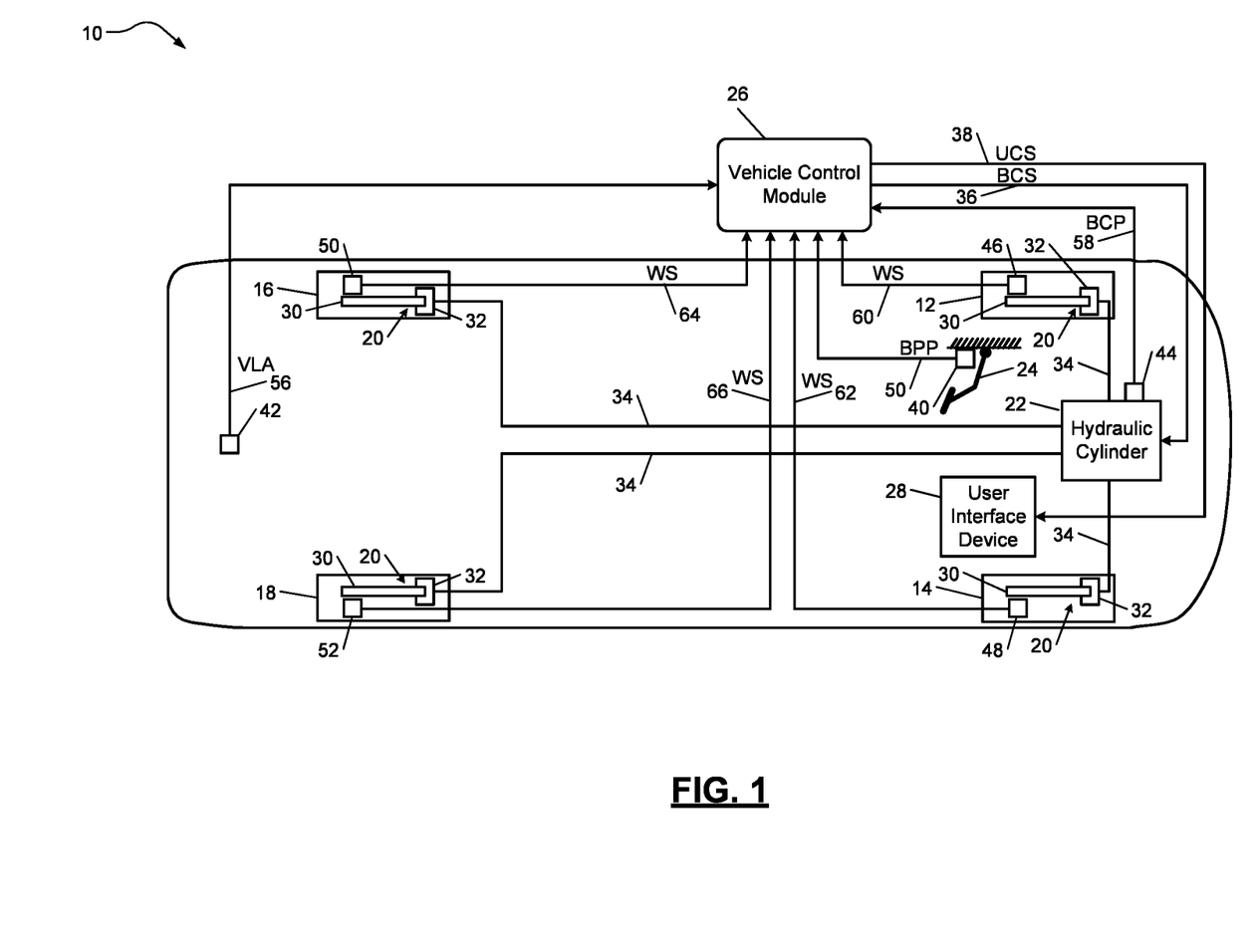
FIG. 1 is a functional block diagram of an example vehicle system according to the present disclosure.

Referring now to FIG. 1, a vehicle system 10 includes a left front wheel 12, a right front wheel 14, a left rear wheel 16, a right rear wheel 18, friction brakes 20, a hydraulic cylinder 22, a brake pedal 24, a vehicle control module 26, and a user interface device 28. Each friction brake 20 is coupled to one of the wheels 12, 14, 16, or 18. Each friction brake 20 decreases the rotational speed of the one of the wheels 12, 14, 16, or 18 to which that friction brake 20 is coupled.

The friction brakes 20 are disc brakes. Thus, each friction brake 20 includes a brake rotor 30 and a brake caliper 32. The brake rotor 30 is attached to one of the wheels 12, 14, 16, or 18 and rotates therewith. Each brake caliper 32 is attached to an axle (not shown) or a suspension knuckle (not shown). When the friction brakes 20 are applied, the brake calipers 32 press brake pads (not shown) against opposite planar surfaces of the brake rotors 30 to create friction and thereby decrease the rotational speeds of the wheels 12, 14, 16, 18.

The hydraulic cylinder 22 regulates the pressure of brake fluid in brake lines 34 that extend from the hydraulic cylinder 22 to the friction brakes 20. For example, the hydraulic cylinder 22 increases the pressure of brake fluid in the brake line 34 that extends to the friction brake 20 on the left front wheel 12 to apply that friction brake 20. Conversely, the hydraulic cylinder 22 decreases the pressure of brake fluid in the brake line 34 that extends to the friction brake 20 on the left front wheel 12 to release that friction brake 20.

The vehicle control module 26 controls the hydraulic cylinder 22 to apply and release the friction brakes 20. In one example, the vehicle control module 26 applies the friction brakes 20 when a driver depresses the brake pedal 24, and the vehicle control module 26 releases the friction brakes 20 when the driver stops depressing the brake pedal 24. In another example, the vehicle control module 26 applies and releases the friction brakes 20 when performing functions such as anti-lock braking, stability control, and traction control.

The vehicle control module 26 controls the hydraulic cylinder 22 by outputting a brake control signal 36 to the hydraulic cylinder 22. The brake control signal 36 indicates which of the friction brakes 20 to apply and the amount by which to apply the friction brakes 20. In one example, the brake control signal 36 indicates a target pressure of brake fluid in each brake line 34 or a target brake torque, and the hydraulic cylinder 22 regulates the pressure of brake fluid within the brake lines 34 to achieve the target pressure or the target brake torque.

The vehicle control module 26 controls the user interface device 28 to generate messages. The user interface device 28 is operable to generate a visual message (e.g., text, a light, and/or a symbol), an audible message (e.g., a chime), and/or a tactile message (e.g., a vibration). The user interface device 28 may include an electronic display (e.g., a touchscreen), a speaker, and/or a vibrating motor. The vehicle control module 26 controls the user interface device 28 by outputting a user interface device (UID) control signal 38 to the user interface device 28. The UID control signal 38 indicates the messages to be generated by the user interface device 28.

The vehicle control module 26 controls the friction brakes 20 and the user interface device 28 based on inputs from sensors. The sensors include a brake pedal position (BPP) sensor 40, a vehicle longitudinal acceleration (VLA) sensor 42, a brake circuit pressure (BCP) sensor 44, a left front wheel speed (WS) sensor 46, a right front WS sensor 48, a left rear WS sensor 50, and a right rear WS sensor 52. The BPP sensor 40 measures the position of the brake pedal 24 and generates a BPP signal 54 indicating the brake pedal position (e.g., a depression percentage). The VLA sensor 42 measures a longitudinal (fore/aft) acceleration of a vehicle and generates a VLA signal 56 indicating the vehicle longitudinal acceleration. The BCP sensor 44 measures the pressure of brake fluid within the hydraulic cylinder 22, which is referred to herein as brake circuit pressure, and generates a BCP signal 58 indicating the brake circuit pressure.

If the vehicle system 10 is part of a self-driving or autonomous vehicle, the brake pedal 24 may be omitted from the vehicle system 10, and boost plunger position may be used in place of the brake pedal position throughout this application. If the brake pedal 24 is not omitted from the vehicle system 10, the boost plunger position may be used in addition to the brake pedal position. The boost plunger position is the position of a boost plunger (not shown), which may be connected to the brake pedal 24 or, in the case of an autonomous vehicle actuated by a device (not shown). Thus, the boost plunger position, like the brake pedal position, indicates an amount of braking demanded by the driver, although the driver is a module in an autonomous vehicle.

The left front WS sensor 46 measures the rotational speed of the left front wheel 12 and generates a WS signal 60 indicating the left front wheel speed. The right front WS sensor 48 measures the rotational speed of the right front wheel 14 and generates a WS signal 62 indicating the right front wheel speed. The left rear WS sensor 50 measures the rotational speed of the left rear wheel 16 and generates a WS signal 64 indicating the left rear wheel speed. The right rear WS sensor 52 measures the rotational speed of the right rear wheel 18 and generates a WS signal 66 indicating the right rear wheel speed.

As discussed above, the brake calipers 32 press the brake pads against the opposite planar surfaces of the brake rotors 30 to create friction and thereby decrease the rotational speeds of the wheels 12, 14, 16, 18. Over time, this causes inconsistent wear grooves in the opposite planar surfaces of the brake rotors 30, which results in variations in the thicknesses of the brake rotors 30. As the thickness variation of the brake rotors 30 increases, the friction brakes 20 may not perform as well as the friction brakes 20 perform when the friction brakes 20 are new.

The vehicle control module 26 assesses the health of the brake rotors 30 by performing dynamic brake torque distribution, determining brake health indicators, and estimating rotor thickness variations. Dynamic brake torque distribution involves applying the friction brakes 20 on different sets of the wheels 12, 14, 16, 18 to satisfy a brake torque request during a braking event and measuring vehicle operating conditions during the braking event. The brake health indicators include characteristics of signals indicating the vehicle operating conditions measured during a braking event.

The brake health indicators may also include a measure of correlation between these signals. The vehicle control module 26 may convert these signals from a time domain to an angle domain before determining the brake health indicators based thereon. The vehicle control module 26 estimates the rotor thickness variations based on the brake health indicators using regression models. The vehicle control module 26 identifies a fault in one of the brake rotors 30 when the thickness variation of that brake rotor 30 is greater than a predetermined value. The techniques for performing dynamic brake torque distribution and determining the brake health indicators disclosed herein may be performed independent of one another. For example, the vehicle control module 26 may determine the brake health indicators and estimate the rotor thickness variations based on the brake health indicators without performing dynamic brake torque distribution.

Figure 2:
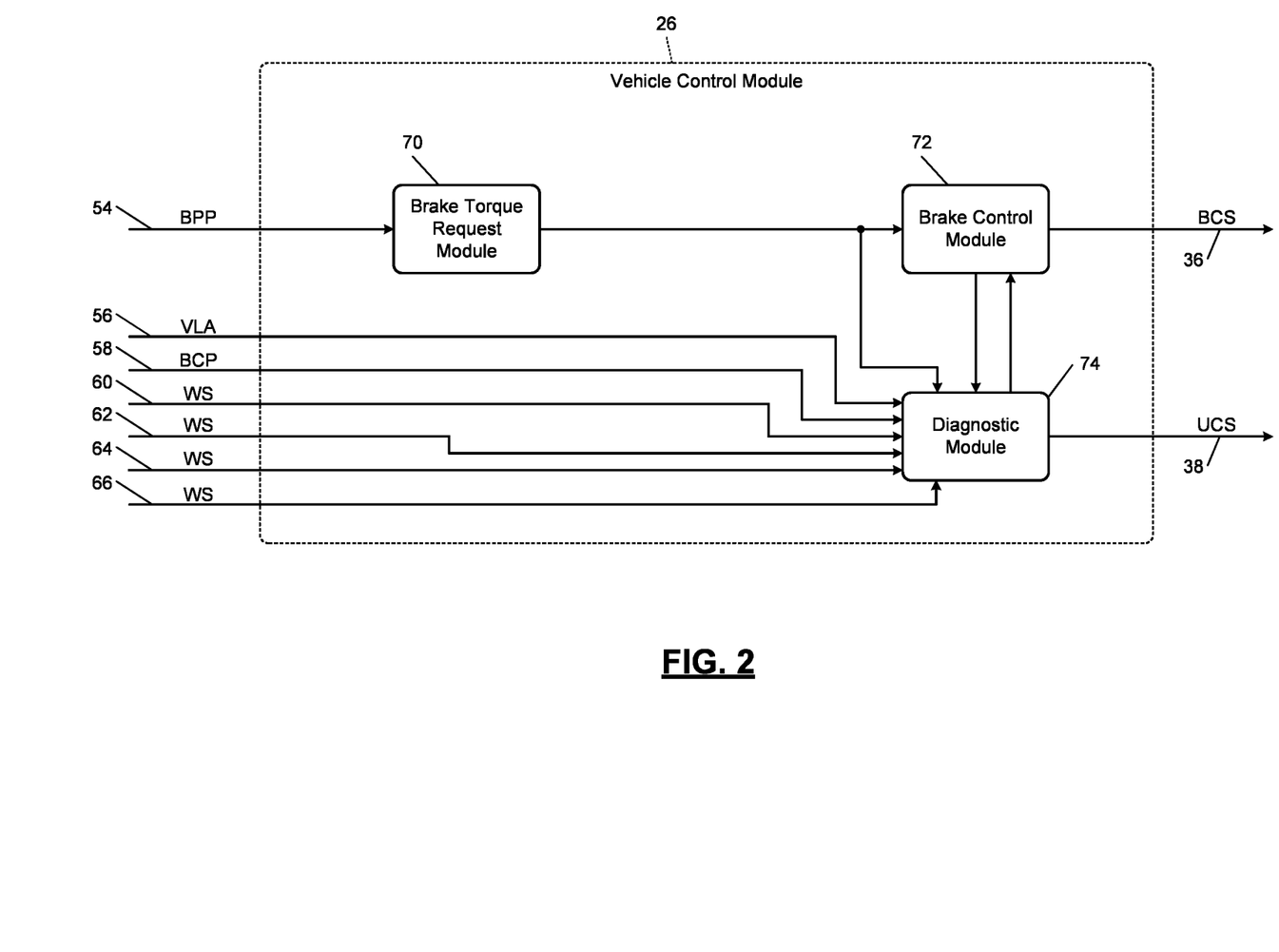
FIG. 2 is a functional block diagram of an example brake control system according to the present disclosure.

Referring now to FIG. 2, an example implementation of the vehicle control module 26 includes a brake torque request module 70, the brake control module 72, and a diagnostic module 74. The brake torque request module 70 generates a brake torque request based on the brake pedal position indicated by the BPP signal 54. Additionally or alternatively, the brake torque request module 70 may generate the brake torque request based on the boost plunger position. Additionally or alternatively, the brake torque request module 70 may generate the brake torque request based on an input from an anti-lock brake system (not shown), a stability control system (not shown), and/or a traction control system (not shown). The brake torque request module 70 outputs the brake torque request.

The brake control module 72 applies one or more (e.g., all) of the friction brakes 20 to satisfy the brake torque request during a braking event. The brake control module 72 applies the friction brakes 20 by outputting the brake control signal 36 to the hydraulic cylinder 22. As discussed above, the brake control signal 36 may indicate a target pressure or target brake torque for each friction brake 20. Thus, the brake control module 72 may control the friction brakes 20 to simultaneously apply different brake torques on different ones of the wheels 12, 14, 16, 18. The brake control module 72 may output a signal to the diagnostic module 74 indicating when the friction brakes 20 are applied and which ones of the friction brakes 20 are applied.

The diagnostic module 74 assesses the health of the brake rotors 30 based on the inputs from the sensors during the braking event. The inputs include the VLA signal 56, the BCP signal 58, and the WS signals 60, 62, 64, and 66. The diagnostic module 74 controls the user interface device 28 to generate a message indicating the health of the brake rotors 30. The diagnostic module 74 controls the user interface device 28 by outputting the UID control signal 38 to the user interface device 28. The diagnostic module 74 may output a signal to the brake control module 72 indicating which of the friction brakes 20 to apply to satisfy the brake torque request.

Figure 3:
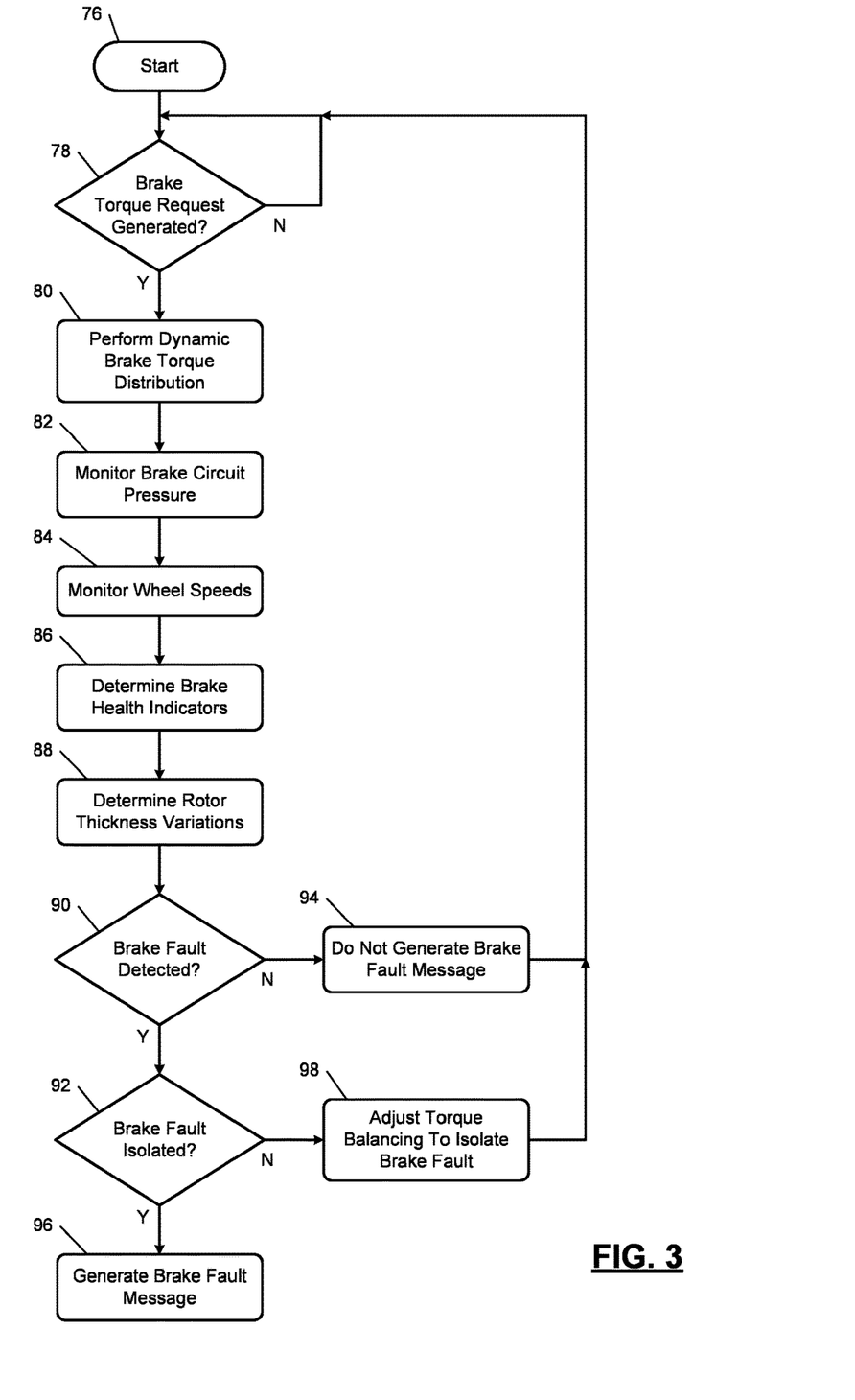
FIGS. 3 through 5 are flowcharts illustrating example methods of assessing the health of brake rotors according the present disclosure.

Referring now to FIG. 3, an example method for detecting and isolating brake rotor faults begins at 76. In the description of the methods set forth below, the modules of FIG. 2 perform the steps of the methods. However, the particular modules that perform the steps of the methods may differ from the description below. Additionally or alternatively, one or more steps of the methods may be performed independent of any module.

At 78, the diagnostic module 74 determines whether a brake torque request has been generated. The diagnostic module 74 determines whether the brake torque request has been generated based on an input from the brake torque request module 70. If a brake torque request has been generated, the method continues at 80. Otherwise, the method remains at 78.

At 80, the brake control module 72 performs dynamic brake torque distribution when controlling the friction brakes 20 satisfy the brake torque request during a braking event. An example method of performing dynamic brake torque distribution is discussed below with reference to FIG. 4. At 82, the BCP sensor 44 monitors the pressure of brake fluid within the hydraulic cylinder 22 (i.e., the brake circuit pressure). At 84, the wheel speed sensors 46, 48, 50, 52 monitor the speeds of the wheels 12, 14, 16, 18.

At 86, the diagnostic module 74 determines brake health indicators based on the VLA signal 56, the MPC signal 58, and the WS signals 66, 62, 64, 66 during the braking event. At 88, the diagnostic module 74 determines variations in the thicknesses of the brake rotors 30 based on the brake health indicators. An example method of determining the brake health indicators and rotor thickness variations is discussed below with reference to FIG. 5.

At 90, the diagnostic module 74 determines whether a brake fault is detected. The diagnostic module 74 may detect a brake fault when the thickness variation of one or more of the brake rotors 30 is greater than a predetermined value (e.g., 20 micrometers). If a brake fault is detected, the method continues at 92. Otherwise, the method continues at 94. At 94, the diagnostic module 74 does not control the user interface device 28 to generate a brake fault message.

At 92, the diagnostic module 74 determines whether the brake fault has been isolated to a particular one of the wheels 12, 14, 16, or 18. If the brake fault has been isolated, the method continues at 96. Otherwise, the method continues at 98. At 96, the diagnostic module 74 controls the user interface device 28 to generate the brake fault message. The brake fault message may indicate that a brake fault has been detected and which one of the wheels 12, 14, 16, or 18 has the brake fault.

At 98, the brake control module 72 adjusts torque balancing to isolate the brake fault. In one example, the brake control module 72 applies different brake torques using the friction brakes 20 to satisfy the next brake torque request. Thus, while the method continues from step 98 to step 78, the brake control module 72 may not apply the different brake torques until after step 78. A more detailed example of adjusting torque balancing is discussed below with reference to FIG. 4.

Figure 4:
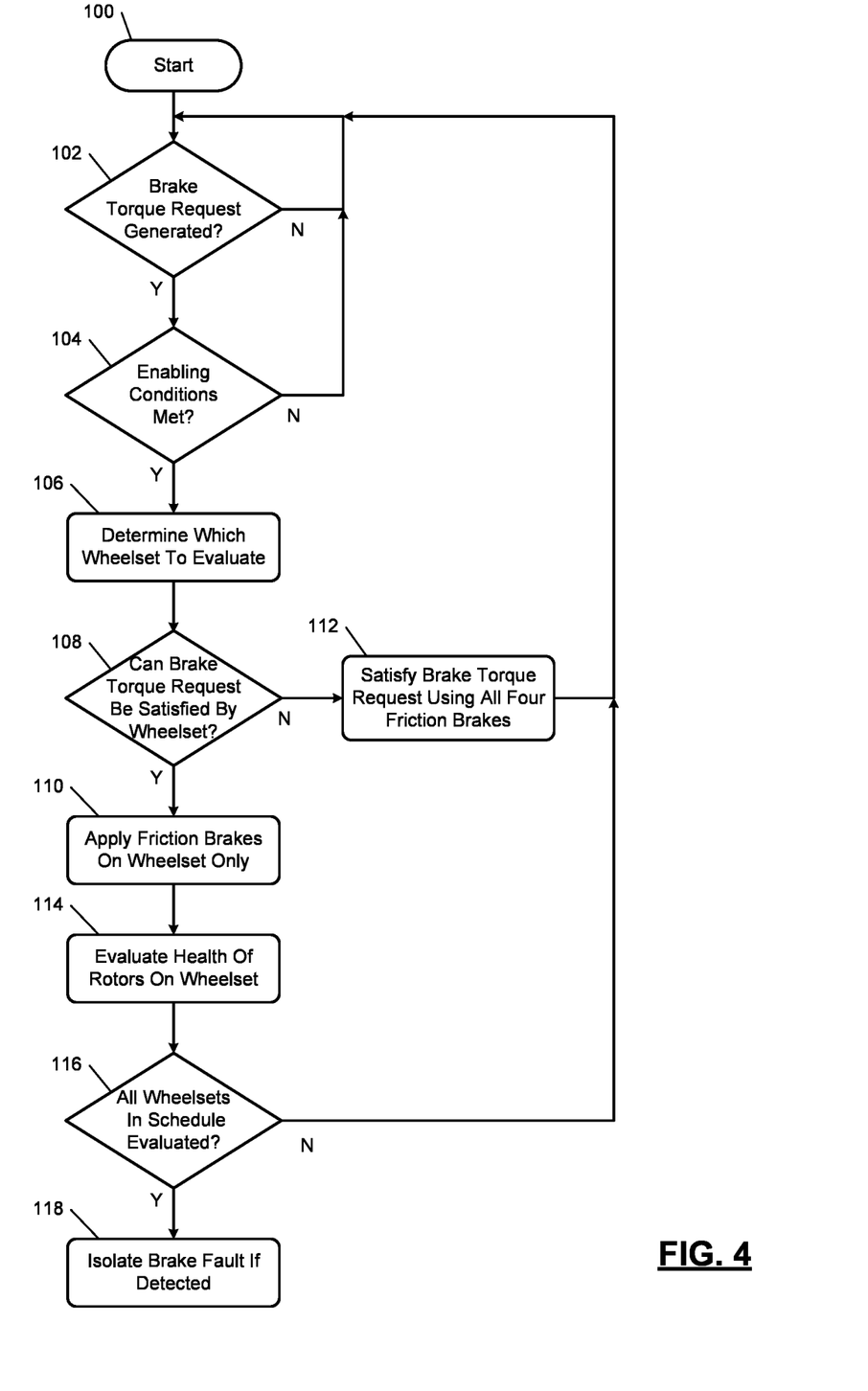

Referring now to FIG. 4, an example method of performing dynamic brake torque distribution begins at 100. At 102, the diagnostic module 74 determines whether a brake torque request has been generated. If a brake torque request has been generated, the method continues at 104. Otherwise, the method remains at 102.

At 104, the diagnostic module 74 determines whether one or more enabling conditions are met. If the enabling conditions are met, the method continues at 106. Otherwise, the method returns to 102. The diagnostic module 74 may determine whether some enabling conditions are met to confirm that the vehicle is performing a moderate braking event. Such enabling conditions may be met when brake pedal position is greater than a predetermined percentage, the speed of the vehicle is greater than a predetermined speed, and/or the deceleration of the vehicle is greater than a predetermined deceleration. The diagnostic module 74 may determine the vehicle speed using the WS signals 60, 62, 64, 66.

The diagnostic module 74 may determine whether another enabling condition is met to confirm that the vehicle is not turning. Such an enabling condition may be met when a steering wheel angle is less than a predetermined angle. The diagnostic module 74 may determine whether other enabling conditions are met to confirm that it is acceptable to satisfy the brake torque request using less than all of the friction brakes 20. Such enabling conditions may be met when anti-lock braking, stability control, and traction control are not being performed.

At 106, the brake control module 72 determines which wheelset of the vehicle to evaluate. Each wheelset includes a unique combination of one or more (e.g., two, all) of the wheels 12, 14, 16, 18. The brake control module 72 may determine which wheelset of the vehicle to evaluate based on a predetermined schedule that maps a brake event number to a particular wheelset.

In one example, the predetermined schedule specifies first, second, third, fourth, and fifth wheelset for first, second, third, fourth, and fifth braking events, respectively. The first wheelset includes all of the wheels 12, 14, 16, 18. The second wheelset includes only the front wheels 12, 14. The third wheelset includes only the rear wheels 16, 18. The fourth wheelset includes the left front wheel 12 and the right rear wheel 18. The fifth wheelset includes the right front wheel 14 and the left rear wheel 16.

The brake control module 72 may select a wheelset from the predetermined schedule according to the brake event number. For example, the brake control module 72 may select the first wheelset for the first braking event. Additionally or alternatively, the brake control module 72 may select a wheelset from the predetermined schedule based on the brake health indicators determined during previous brake events. For example, if the brake health indicators indicate that a brake fault is most likely associated with one of the rear wheels 16, 18, the brake control module 72 may select the fourth or fifth wheelset for the second brake event instead of the second wheelset.

At 108, the brake control module 72 determines whether the brake torque request can be satisfied by the friction brakes 20 on the selected wheelset. If the brake torque request can be satisfied by the friction brakes 20 on the selected wheelset, the method continues at 110. Otherwise, the method continues at 112. At 112, the brake control module 72 applies the friction brakes 20 on all four of the friction brakes 20 to satisfy the brake torque request during the braking event. At 110, the brake control module 72 applies the friction brakes 20 on the selected wheelset only to satisfy the brake torque request during the braking event.

At 114, the diagnostic module 74 evaluates the health of the brake rotors 30 on the selected wheelset based on vehicle operating conditions measured during the braking event. The diagnostic module 74 accomplishes this by determining the brake health indicators based on the vehicle operating conditions and determining the thickness variations of the brake rotors 30 based on the brake health indicators. An example method for determining brake health indicators and rotor thickness variations is discussed in detail below with reference to FIG. 5.

At 116, the brake control module 72 determines whether all of the wheelsets in the predetermined schedule have been evaluated. If all of the wheelsets in the predetermined schedule have been evaluated, the method continues at 118. Otherwise, the method returns to 102. At 118, the diagnostic module 74 isolates any brake faults detected when evaluating all of the wheelsets in the predetermined schedule. For example, if a brake fault is detected when evaluating the first, third, and fifth wheelsets, the diagnostic module 74 determines that the brake rotor 30 on the left rear wheel 16 is faulty.

Figure 5:
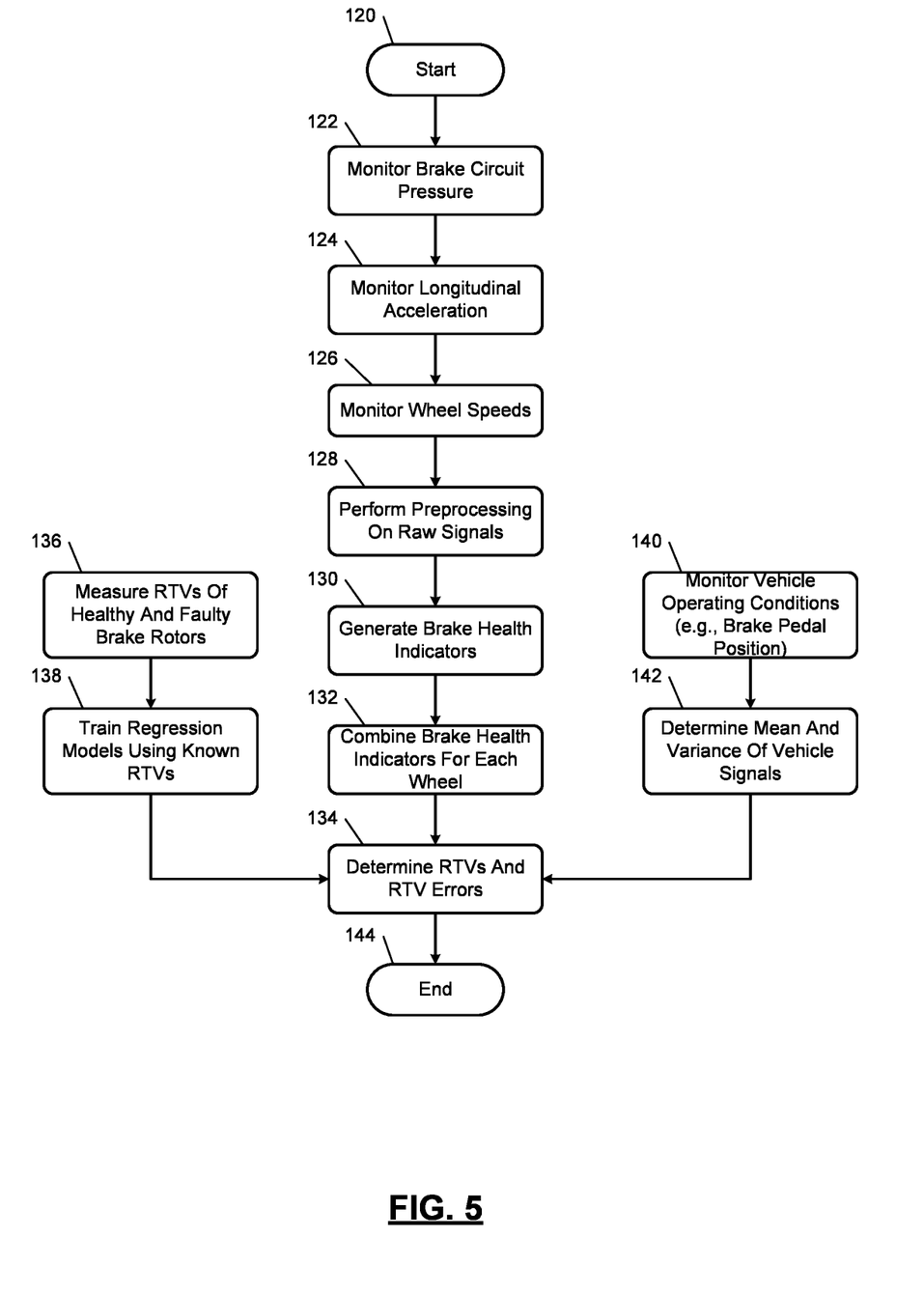

Referring now to FIG. 5, a method for determining brake health indicators and rotor thickness variations begins at 120. At 122, the BCP sensor 44 monitors the pressure of brake fluid within the hydraulic cylinder 22 (i.e., the brake circuit pressure) during a braking event and generates the BCP signal 58 indicating the brake circuit pressure. At 124, the VLA sensor 42 measures the longitudinal acceleration of the vehicle during the braking event and generates the VLA signal 56 indicating the vehicle longitudinal acceleration. At 126, the WS sensors 46, 48, 50, 52 measure the speeds of the wheels during the braking event and output the WS signals 66, 62, 64, 66 indicating the wheel speeds.

At 128, the diagnostic module 74 performs preprocessing on the raw vehicle signals (e.g., the BCP signal 58, the VLA signal 56, and the WS signals 66, 62, 64, 66). In one example, the diagnostic module 74 detrends the raw vehicle signals by, for example, removing changes to the means of these signals over time. In another example, the diagnostic module 74 applies a low-pass filter to the raw vehicle signals to filter out high frequency content (e.g., noise). In another example, the diagnostic module 74 applies a high-pass filter to the raw vehicle signals to filter out low frequency content. In another example, the diagnostic module 74 converts the raw vehicle signals from the time domain to the frequency domain.

At 130, the diagnostic module 74 determines the brake health indicators based on the preprocessed (e.g., detrended, filtered) vehicle signals. The brake health indicators include one or more characteristics of the VLA signal 56, the BCP signal 58, and the WS signals 66, 62, 64, 66 during the braking event after these signals have been preprocessed. The brake health indicators may include the peak-to-peak amplitudes of the VLA signal 56 and the BCP signal 58, in the time domain and the frequency domain, during the braking event. Thus, the diagnostic module 74 may generate four brake health indicators based on the VLA signal 56 and the BCP signal 58 during the braking event. The brake health indicators may include the peak-to-peak amplitudes of the WS signals 60, 62, 64, 66, in the time domain, during the braking event and amplitudes at critical frequencies of the WS signals 60, 62, 64, 66, in the frequency domain, during the braking event. Thus, the diagnostic module 74 may generate eight brake health indicators based on the WS signals 60, 62, 64, 66 during the braking event.

Each brake health indicator may indicate the health of the brake rotors 30 on one or more of the wheels 12, 14, 16, 18. For example, larger peak-to-peak amplitudes of the VLA signal 56 and/or the BCP signal 58 may indicate a fault in the brake rotor 30 on any of the wheels 12, 14, 16, 18, while smaller peak-to-peak amplitudes of the VLA signal 56 and/or the BCP signal 58 may indicate that all of the brake rotors 30 are healthy. In another example, the peak-to-peak amplitudes of the WS signals 60, 62, 64, 66 may indicate the health of the brake rotors 30 on the wheels 12, 14, 16, 18, respectively.

At 132, the diagnostic module 74 combines the brake health indicators for each of the wheels 12, 14, 16, 18. The diagnostic module 74 may accomplish this for each of the wheels 12, 14, 16, 18 by determining a weighted average value of all of the brake health indicators that indicate the health of the brake rotor 30 on the respective one of the wheels 12, 14, 16, 18. For example, the diagnostic module 74 may combine the brake health indicators for the left front wheel 12 by determining the weighted average value of the peak-to-peak amplitudes of the VLA signal 56, the BCP signal 58, the WS signal 60 in the time domain, and the WS signal 60 in the frequency domain. The diagnostic module 74 may combine the brake health indicators for each of the wheels 12, 14, 16, 18 sequentially or in parallel using, for example, a Kalman filter.

At 134, the diagnostic module 74 determines the thickness variation of each brake rotor 30 and an error of each rotor thickness variation. The diagnostic module 74 determines the rotor thickness variations based on the brake health indicators using regression models. The regression models are predetermined relationships between the brake health indicators and the rotor thickness variations. The diagnostic module 74 determines the error of each rotor thickness variation based on vehicle operating conditions measured during the braking event such as brake pedal position, vehicle speed, and boost plunger position. For example, the error may be low at low vehicle speeds, and the error may be high at high vehicle speeds.

Steps 136 and 138 may be performed before 122 through 134 to obtain the regression models used at 134 to determine the rotor thickness variations. At 136, the rotor thickness variations of several (e.g., 20) healthy and faulty brake rotors are measured. At 138, regression models are trained using the known rotor thickness variations. In one example, the regression models estimate the brake health indicators based on each rotor thickness variation. The brake health indicators are then calculated based on vehicle operating conditions measured during braking events, and the regression models are adjusted based on the calculated brake health indicators. The regression models are then inverted to yield the regression models used at 142.

Steps 140 and 142 may be performed in parallel with 122 through 134 to obtain information used at 134 to determine the error of each rotor thickness variation. At 140, sensors monitor vehicle operating conditions during the braking event and generate vehicle signals indicating the vehicle operating conditions. For example, the vehicle signals may indicate the brake pedal position, the vehicle speed, and the boost plunger position measured during the braking event. At 142, the diagnostic module 74 determines the mean and variance of the vehicle signals. The diagnostic module 74 may determine the error of the rotor thickness variations based on the mean and variance of the vehicle signals using a predetermined relationship therebetween. The method ends at 144.

Figure 6:
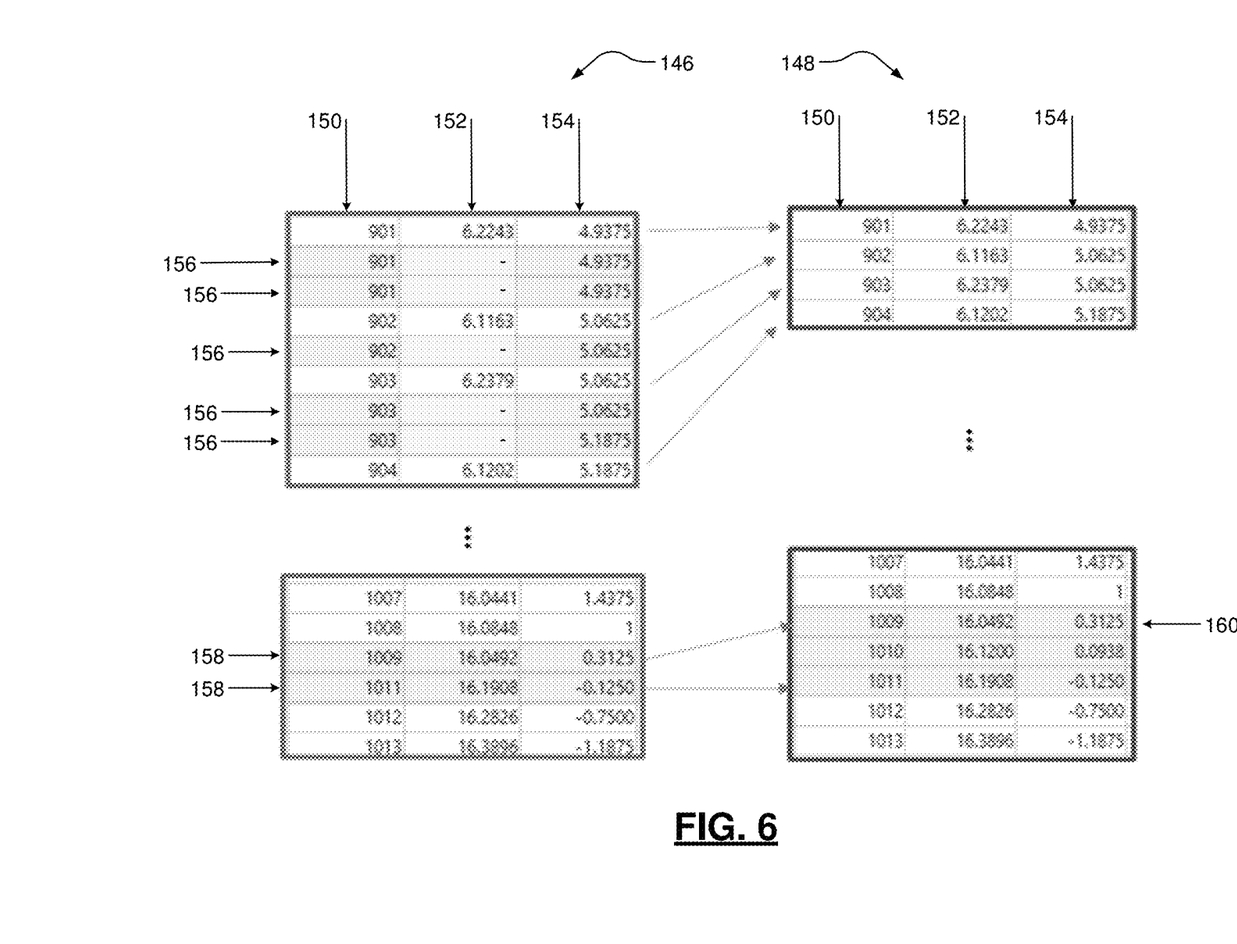
FIG. 6 includes tables illustrating a transformation of vehicle signals from a time domain to an angle domain.

Referring now to FIG. 6, a first table 146 and a second table 148 illustrate a transformation of the WS signals 60, 62, 64, 66 and a steering wheel angle signal from the time domain to an angle domain. Each of the first and second tables 146 and 148 includes a first column 150, a second column 152, and a third column 154. The first column 150 indicates pulse counts, the second column 152 indicates wheel speeds, and the third column 154 indicates steering wheel angles. Each row in the first and second tables 146 and 148 corresponds to a time stamp, and the interval between consecutive time stamps is constant.

Each of the WS sensors 46, 48, 50, 52 measures pulses in a raw wheel speed signal as the corresponding one of the wheels 12, 14, 16, 18 passes through predetermined angular increments. The pulse counts indicate the number of pulses generated by the respective one of the WS sensors 46, 48, 50, 52 since the pulse count was last reset. The WS sensors 46, 48, 50, 52 determine the speeds of the wheels 12, 14, 16, 18, respectively, at the time stamps corresponding to the pulses based on the elapsed times between the pulses. The WS signals 60, 62, 64, 66 may indicate the wheel speeds, the pulse counts, and the corresponding time stamps. The steering wheel angle signal indicates the steering wheel angles and the corresponding time stamps. While the steering wheel angle signal is used to explain how to transform vehicle signals from the time domain to the angle domain, the same method may be used to transform other vehicle signals, such as the VLA signal 56 or the BCP signal 58, from the time domain to the angle domain.

When the vehicle speed is low, the rate at which the steering wheel angle sensor measures the steering wheel angle is faster than the rate at which the WS sensors 46, 48, 50, 52 generate pulses. Thus, the steering wheel angle signal indicates steering wheel angles at times between the pulses. An example of this is shown in rows 156 of the first table 146. In the rows 156, there are dashes in the first column since the WS sensors 46, 48, 50, 52 do not determine the wheel speeds at time stamps between the pulses. For these time stamps, the WS signals 60, 62, 64, 66 may indicate null values or the same wheel speed value as the previous row.

When the vehicle speed is high, the rate at which the WS sensors 46, 48, 50, 52 determine the wheel speeds is slower than the rate at which the WS sensors 46, 48, 50, 52 generate pulses. Thus, the WS sensors 46, 48, 50, 52 do not determine a wheel speed for every pulse. An example of this is shown in rows 158 of the first table 146, where the pulse count skips from 1009 to 1011. Thus, the WS signals 60, 62, 64, 66 do not indicate a wheel speed for pulse 1010.

When converting the WS signals 60, 62, 64, 66 and the steering wheel angle signal from the time domain to the angle domain, the diagnostic module 74 removes the wheel speeds and the steering wheel angles corresponding to time stamps between the pulses. In this example, the diagnostic module 74 removes the wheel speeds and the steering wheel angles in the rows 156. In addition, the diagnostic module 74 uses interpolation to determine wheel speeds at pulse counts for which the WS sensors 46, 48, 50, 52 did not determine the wheel speeds. In this example, the diagnostic module 74 adds the wheel speed and the steering wheel angle for pulse 1010, as shown in row 160 of the second table 148.

The converted WS signals 60, 62, 64, 66 and the converted steering wheel angle signal indicate the values in the second table 148. The second table 148 includes only the wheel speeds and the steering wheel angles at the pulses, and the second table 148 includes the wheel speed and the steering wheel angle at every pulse. In addition, the angular increment between the pulses is constant. Thus, the angular increment between consecutive rows in the second table 148 is constant. The above transformation process may be used to detect brake rotor faults and other types of wheel-level faults such as brake pad faults and wheel bearing faults.

Figure 7:
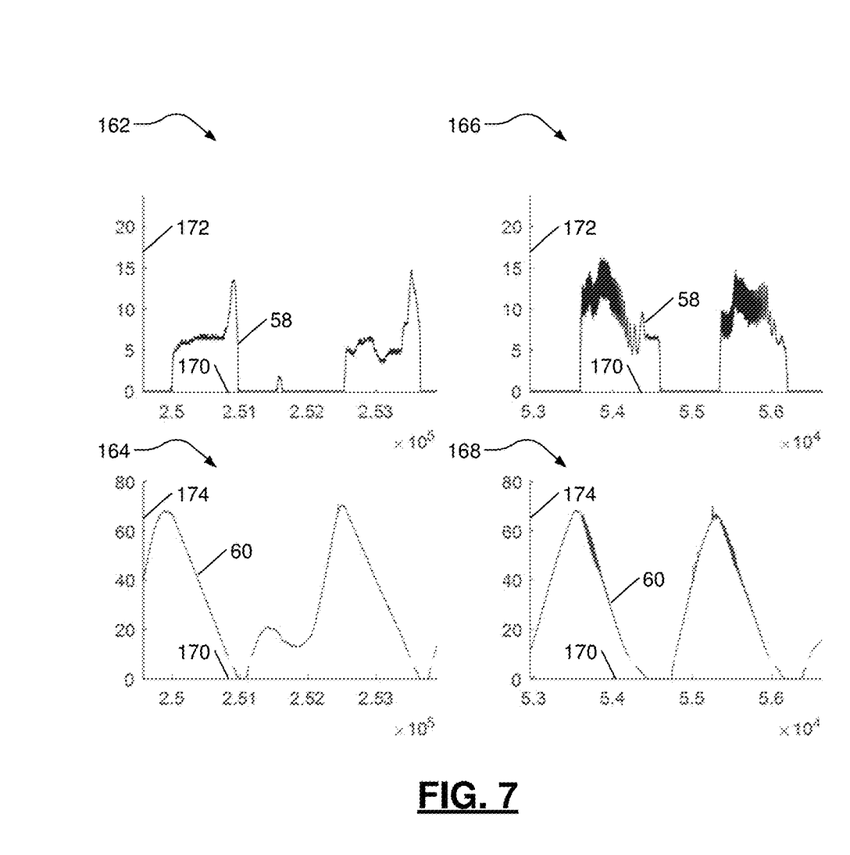
FIG. 7 includes graphs illustrating a brake circuit pressure signal and a wheel speed signal for a healthy rotor and a faulty rotor.

Referring now to FIG. 7, first and second graphs 162 and 164 illustrate examples of the BCP signal 58 and the WS signal 60 (for the left front wheel 12), respectively, when all of the brake rotors 30 are healthy. Third and fourth graphs 166 and 168 illustrate example of the BCP signal 58 and the WS signal 60, respectively, when the brake rotor 30 on the left front wheel 12 is faulty. In the first and third graphs 162 and 166, the BCP signal 58 is plotted with respect to an x-axis 170 that represents pulse count and a y-axis 172 that represents pressure in bars. In the second and fourth graphs 164 and 168, the WS signal 60 is plotted with respect to the x-axis 170 and a y-axis 174 that represents wheel speed in kilometers per hour.

While there are some high frequency oscillations in the BCP signal 58 in the first graph 162, the magnitude of the high frequency oscillations is small. In addition, there are little to no high frequency oscillations in the WS signal 60 in the second graph 164. This lack of high frequency oscillations having large magnitudes in the BCP and WS signals 58 and 60 indicate that the thickness variation of all of the brake rotors 30 is small (e.g., within an acceptable level).

In contrast, in the third and fourth graphs 166 and 168, there are high frequency oscillations having large magnitudes in both the BCP signal 58 and the WS signal 60 just before pulse counts $5.4 \times 10^4$ and $5.6 \times 10^4$. The magnitude of the high frequency oscillations in the BCP signal 58 indicates that the thickness variation of at least one of the brake rotors 30 is large (e.g., outside of an acceptable level). The fact that the high frequency oscillations in the BCP and WS signals 58 and 60 correlate with one another indicate that the thickness variations of the brake rotor 30 on the left front wheel 12 is large. Thus, the correlation between the BCP and WS signals 58 and 60 enables isolating the brake rotor fault to the left front wheel 12.

Figure 8:
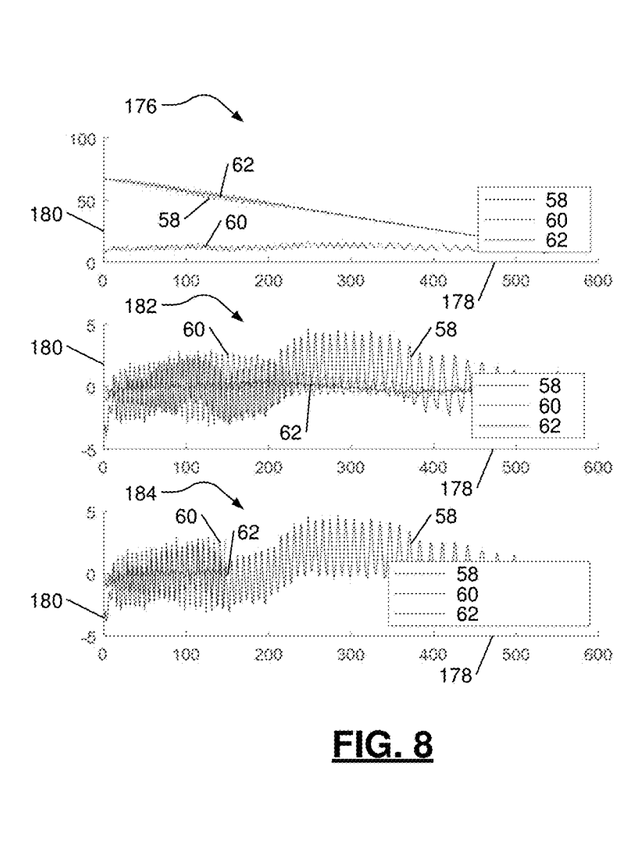
FIG. 8 includes graphs illustrating raw and filtered vehicle signals.

Referring now to FIG. 8, a first graph 176 illustrates examples of the BCP signal 58, the WS signal 60, and the WS signal 62 in their raw forms plotted with respect to an x-axis 178 that represents time and a y-axis 180 that represents magnitude. A second graph 182 illustrates examples of the BCP signal 58, the WS signal 60, and the WS signal 62 after detrending has been performed on these signals. A third graph 184 is the same as the second graph 182 except that only initial portions of the WS signals 60, 62 are shown in the third graph 184.

In the first graph 176, the raw forms of the BCP signal 58 and the WS signal 60 have some oscillations, and the WS signal 62 has little to no oscillations. However, it is difficult to determine whether the oscillations in the BCP signal 58 and the WS signal 60 correlate with one another, and whether the magnitude of those oscillations are large enough to indicate a faulty brake rotor. In contrast, in the second graph 182, the detrended forms of the BCP signal 58 and the WS signal 60 have large oscillations, and it is clear that the oscillations correlate with one another.

To assess the correlation between the BCP signal 58 and the WS signals 60, 62, the diagnostic module 74 performs cross correlation. In the process, the diagnostic module 74 shifts the BCP signal 58 or the WS signals 60, 62 along the x-axis 178 to create a lag, determines a correlation coefficient, and repeats these two steps until the lag with the highest correlation coefficient is identified. The diagnostic module 74 may diagnose a fault in one of the brake rotors 30 when the corresponding correlation coefficient is greater than a predetermined value (e.g., 0.6). Thus, the diagnostic module 74 may use the correlation coefficient as a brake health indicator. The BCP signal 58 and the portion of the WS signal 60 shown in the third graph 184 have a correlation coefficient of 0.71. The BCP signal 58 and the portion of the WS signal 62 shown in the third graph 184 have a correlation coefficient of 0.53.

The diagnostic module 74 may assess the correlation between the VLA signal 56 and the WS signals 60, 62, 64, 66, using the same technique as that described above. The diagnostic module 74 may use the correlation coefficient determined for each of the WS signals 60, 62, 64, 66 as a brake health indicator for the friction brake 20 on the corresponding one of the wheels 12, 14, 16, 18. For example, the diagnostic module 74 may diagnose a fault in the brake rotor 30 on the front left wheel 12 when the correlation coefficient between the VLA signal 56 and the WS signal 60 is greater than the predetermined value.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a brake torque request module configured to generate a brake torque request based on a brake pedal position during a braking event;
a brake control module configured to apply friction brakes on a wheelset of a vehicle to satisfy the brake torque request during the braking event, wherein the wheelset includes less than all wheels of the vehicle;
a wheel speed sensor configured to generate a wheel speed signal indicating a speed of the wheel as a function of time; and
a diagnostic module configured to:
convert the wheel speed signal from a time domain to an angle domain, wherein the converted wheel speed signal indicates the speed of the wheel as a function of an angle of the wheel; and
detect a fault in a brake rotor on a wheel in the wheelset based on the wheel speed signal measured during the braking event.

2. The system of claim 1 wherein the wheelset includes only two of the wheels of the vehicle.

3. The system of claim 1 wherein the diagnostic module is further configured to detect the fault in the brake rotor on the wheel in the wheelset further based on at least one of brake circuit pressure and vehicle longitudinal acceleration.

4. The system of claim 1 wherein the brake control module is configured to:
determine whether an enabling condition is met;
apply the friction brakes on the wheelset to satisfy the brake torque request when the enabling condition is met; and
apply the friction brakes on all of the wheels of the vehicle to satisfy the brake torque request when the enabling condition is not met, wherein the enabling condition is met when the brake pedal position, a deceleration of the vehicle, and a speed of the vehicle are greater than predetermined values.

5. The system of claim 1 wherein the brake control module is configured to:
determine whether the friction brakes on the wheelset can satisfy the brake torque request;
apply the friction brakes on only the wheelset during the braking event when the friction brakes on the wheelset can satisfy the brake torque request; and
apply the friction brakes on all of the wheels of the vehicle during the braking event when the friction brakes on the wheelset cannot satisfy the brake torque request.

6. The system of claim 1 wherein:
the brake torque request module is configured to generate N brake torque requests based on the brake pedal position during N braking events, wherein N is an integer greater than one;
the brake control module is configured to apply the friction brakes on N wheelsets to satisfy the N brake torque requests during the N braking events, wherein:
the brake control module is configured to apply the friction brakes on only one of N wheelsets during each of the N braking events;
each of the N wheelsets includes a unique combination of the wheels; and
at least one of the N wheelsets include less than all of the wheels; and
the diagnostic module is configured to detect the fault in the brake rotor on the wheel in the N wheelsets based on the wheel speed signal during the N braking events.

7. The system of claim 6 wherein multiple ones of the N wheelsets includes less than all of the wheels of the vehicle.

8. The system of claim 6 wherein:
N is equal to five;
one of the N wheelsets includes all of the wheels of the vehicle; and
the rest of the N wheelsets include only two of the wheels of the vehicle.

9. The system of claim 1 wherein:
the diagnostic module is configured to detect a fault in the brake rotor on a wheel in the wheelset based on a correlation between the wheel speed signal and a brake circuit pressure and a correlation between the wheel speed signal and a vehicle longitudinal acceleration.

10. The system of claim 1 wherein the wheel speed sensor is configured to:
measure pulses in a raw wheel speed signal when the wheel passes through predetermined angular increments;
generate the wheel speed signal to indicate the speed of the wheel at times corresponding to the pulses and at times between the pulses; and
convert the wheel speed signal from the time domain to the angle domain by removing wheel speeds corresponding to the times between the pulses.

11. The system of claim 10 wherein the wheel speed sensor is configured to:
generate the wheel speed signal to indicate the speed of the wheel at times corresponding to a subset of the pulses that does not include all of the pulses;
determine wheel speeds for a remainder of the pulses using interpolation; and
convert the wheel speed signal from the time domain to the angle domain by adding the wheel speeds for the remainder of the pulses.

12. The system of claim 1 comprising a vehicle sensor configured to generate a vehicle signal indicating a vehicle operating condition, other than wheel speed, as a function of time, wherein the diagnostic module is configured to:
convert the vehicle signal from the time domain to the angle domain, wherein the converted vehicle signal indicates the vehicle operating condition as a function of an angle of the wheel; and
detect the fault in the brake rotor of the wheel based on the wheel speed signal and the converted vehicle signal.

13. The system of claim 1 further comprising:
a brake circuit pressure sensor configured to generate a brake circuit pressure signal indicating a pressure of brake fluid within a hydraulic cylinder as a function of time, wherein the hydraulic cylinder actuates a friction brake on the wheel,
wherein the diagnostic module is further configured to detect the fault in the brake rotor of the friction brake based on a correlation between the wheel speed signal during the brake event and the brake circuit pressure signal during the brake event.

14. The system of claim 13 wherein the diagnostic module is configured to:
convert the brake circuit pressure signal from the time domain to the angle domain, wherein the converted brake circuit pressure signal is a function of the angle of the wheel; and
detect a fault in the brake rotor based on a correlation between the converted wheel speed signal and the converted brake circuit pressure signal.

15. The system of claim 13 wherein the diagnostic module is configured to:
detrend the wheel speed signal;
detrend the brake circuit pressure signal; and
detect the fault in the brake rotor based on a correlation between the detrended wheel speed signal and the detrended brake circuit pressure signal.

16. The system of claim 13 wherein the diagnostic module is configured to assess the correlation between the wheel speed signal and the brake circuit pressure signal by:
shifting one of the wheel speed signal and the brake circuit pressure signal; and
determining a correlation coefficient based on the wheel speed signal and the brake circuit pressure signal.

17. The system of claim 16 wherein the diagnostic module is configured to detect a fault in the brake rotor when the correlation coefficient is greater than a predetermined value.

18. A method comprising:
generating a brake torque request based on a brake pedal position during a braking event;
applying friction brakes on a wheelset of a vehicle to satisfy the brake torque request during the braking event, wherein the wheelset includes less than all wheels of the vehicle;
generating a wheel speed signal indicating a speed of the wheel as a function of time;
converting the wheel speed signal from a time domain to an angle domain, wherein the converted wheel speed signal indicates the speed of the wheel as a function of an angle of the wheel; and
detecting a fault in a brake rotor on a wheel in the wheelset based on the wheel speed signal measured during the braking event.

19. The method of claim 18 further comprising:
measuring pulses in a raw wheel speed signal when the wheel passes through predetermined angular increments;
generating the wheel speed signal to indicate the speed of the wheel at times corresponding to the pulses and at times between the pulses; and
converting the wheel speed signal from the time domain to the angle domain by removing wheel speeds corresponding to the times between the pulses.

* * * * *